United States Patent
Stanley et al.

(10) Patent No.: US 10,696,904 B2
(45) Date of Patent: Jun. 30, 2020

(54) PYROLYSIS APPARATUS AND METHOD

(71) Applicant: RAINBOW BEE EATER IP PTY LTD., Somers, Victoria (AU)

(72) Inventors: Ian Stanley, Kalannie (AU); Peter Burgess, Somers (AU)

(73) Assignee: RAINBOW BEE EATER IP PTY LTD, Somers, Vic (AU)

( * ) Notice: Subject to any disclaimer, the term of this patent is extended or adjusted under 35 U.S.C. 154(b) by 0 days.

(21) Appl. No.: 15/567,509

(22) PCT Filed: Apr. 20, 2016

(86) PCT No.: PCT/AU2016/050286
§ 371 (c)(1),
(2) Date: Oct. 18, 2017

(87) PCT Pub. No.: WO2016/168894
PCT Pub. Date: Oct. 27, 2016

(65) Prior Publication Data
US 2018/0119019 A1   May 3, 2018

(30) Foreign Application Priority Data
Apr. 20, 2015  (AU) .............................. 2015901409

(51) Int. Cl.
*C10B 53/02* (2006.01)
*C10B 49/04* (2006.01)
(Continued)

(52) U.S. Cl.
CPC ............... *C10B 53/02* (2013.01); *C10B 7/10* (2013.01); *C10B 47/44* (2013.01); *C10J 3/007* (2013.01);
(Continued)

(58) Field of Classification Search
CPC ......... C10B 47/18; C10B 47/19; C10B 47/34; C10B 47/44; C10B 49/00; C10B 49/02;
(Continued)

(56) References Cited

U.S. PATENT DOCUMENTS 4,123,332 A * 10/1978 Rotter ....................... C10B 7/10
201/15
10,364,394 B2 * 7/2019 Strezov ................... C10B 37/04
(Continued)

FOREIGN PATENT DOCUMENTS

CN       203 866 250 U    10/2014
JP       S52-71503        6/1977
(Continued)

OTHER PUBLICATIONS

International Preliminary Report on Patentability issued in International Application No. PCT/AU2016/050286, dated May 25, 2016.
(Continued)

*Primary Examiner* — Jonathan Luke Pilcher
(74) *Attorney, Agent, or Firm* — Charles C. Achkar; Ostrolenk Faber LLP

(57) ABSTRACT

The present invention relates to a pyrolysis apparatus comprising a pyrolysis chamber have a first end and a second end, a feed inlet connected adjacent the first end of the pyrolysis chamber, a biochar outlet connected adjacent the second end of the pyrolysis chamber, and a gas outlet in fluid communication with the pyrolysis chamber. The pyrolysis chamber and feed inlet further comprise centreless screw conveyors. The present invention alleviates the problems associated with dust, oils and tars being present in the generated syngas. The present invention can also be used in a method of continuously processing biomass.

16 Claims, 3 Drawing Sheets

(51) Int. Cl.
  *B65G 33/14*    (2006.01)
  *B65G 33/26*    (2006.01)
  *C10B 1/06*     (2006.01)
  *C10B 7/10*     (2006.01)
  *C10J 3/00*     (2006.01)
  *C10B 47/44*    (2006.01)

(52) U.S. Cl.
  CPC ............ *B65G 33/14* (2013.01); *B65G 33/265* (2013.01); *C10B 1/06* (2013.01); *C10B 49/04* (2013.01); *C10J 2200/158* (2013.01); *C10J 2300/092* (2013.01); *C10J 2300/0956* (2013.01); *C10J 2300/0959* (2013.01); *Y02E 50/14* (2013.01); *Y02E 50/30* (2013.01); *Y02P 20/145* (2015.11)

(58) Field of Classification Search
  CPC .. C10B 49/04; C10B 1/06; C10B 1/08; C10B 1/10; B65G 33/22; B65G 33/24; B65G 47/18; B65G 47/19; C10J 3/007; C10J 2200/156; C10J 2200/158
  See application file for complete search history.

(56) References Cited

U.S. PATENT DOCUMENTS

| | | |
|---|---|---|
| 2008/0006520 A1 | 1/2008 | Badger |
| 2011/0114144 A1 | 5/2011 | Green et al. |
| 2012/0285814 A1 | 11/2012 | Del Monte et al. |
| 2014/0013657 A1 | 1/2014 | Verma et al. |
| 2016/0244674 A1* | 8/2016 | Strezov ................ C10B 47/44 |

FOREIGN PATENT DOCUMENTS

| | | |
|---|---|---|
| JP | 2001-72979 | 3/2001 |
| JP | 2004-300185 | 10/2004 |
| JP | 2008-248183 | 4/2010 |
| JP | 2004-43180 | 2/2012 |
| JP | 2016-537485 | 10/2014 |
| JP | 2016-124996 | 7/2016 |
| WO | WO 94/10507 A1 | 5/1994 |
| WO | WO 2017/042597 A2 | 3/2017 |

OTHER PUBLICATIONS

International Search Report issued in International Application No. PCT/AU2016/050286, dated May 25, 2016.
Written Opinion of the International Searching Authority issued in International Application No. PCT/AU2016/050286, dated May 25, 2016.
Supplementary European Search Report issued in counterpart EP application No. 16782398.8 dated Nov. 21, 2018.
CN Office Action issued in counterpart CN application No. 201680023940.X dated Aug. 22, 2019.
Common Knowledge Evidence 1: Solid Waste Treatment and Disposal Technology (2nd Edition, Editor-in-Chief: Changqi Peng, Wuhan University of Technology Press, Apr. 2009, pp. 94-97.
Common Knowledge Evidence 2: Solid Waste Treatment and Utilization (Editor-in-Chief: Baoping Han, Huazhong University of Science and Technology Press, Jun. 2010).
JP Office Action issued in counterpart JP application No. 2017-555714 dated Mar. 17, 2020, with partial English language translation.
BR Office Action issued in counterpart BR application No. 112017022482-8 dated Feb. 25, 2020, with English language translation thereof.

* cited by examiner

PYROLYSIS APPARATUS AND METHOD

CROSS REFERENCE TO RELATED APPLICATIONS

The present application is a § 371 National Phase application based on PCT/AU2016/050286 filed Apr. 20, 2016, which claims the benefit of Australian application No. 2015901409 filed Apr. 20, 2015 the subject matter of each of which is incorporated by reference in their entirety.

FIELD OF THE INVENTION

The present invention relates to the field of pyrolysis. More particularly, the invention relates to an apparatus and a method for the pyrolysis and processing of biomass.

BACKGROUND TO THE INVENTION

Biomass is biological material which may be derived from recently living organisms including plant and animal material. Examples of materials from which biomass can be derived are wood from forests, material left over from agricultural and forestry processes, and organic wastes derived from humans, industrial processes and animals. Biomass may be used as a renewable source of fuel to produce heat or electricity. The composition of biomass is largely carbon, hydrogen and oxygen. Biomass may also be employed as a feedstock for other fuels, including the production of syngas, via its pyrolysis.

Pyrolysis is the thermochemical decomposition of organic material at elevated temperatures. Pyrolysis should occur in an atmosphere absent of oxygen (or reactive gas) to ensure that the organic material does not undergo combustion. At these elevated temperatures and in the absence of oxygen the organic material undergoes a chemical decomposition to form syngas and the by-product, biochar. Biochar can be used to generate energy or can, alternatively, be used as a soil amendment agent. Another useful characteristic of the pyrolysis of organic material is that potential greenhouse emissions remain in the solid state (biochar) and are therefore not released into the atmosphere, making it a more environmentally friendly process.

A problem currently encountered in pyrolysis is that dust, oils and tars are often present in the generated syngas. As a result, the syngas will need to be purified before it can be used. Another problem associated with large scale pyrolysis is that it is difficult to continuously pyrolyze biomass. Many pyrolysis systems are sequential systems, whereby biomass is loaded into a chamber, pyrolysis is initiated, syngas is generated and the chamber opened to remove the biochar before a new biomass load can then be added. Disadvantages to this system include syngas being lost when the chamber is opened, the time required for reloading the chamber and the poor energy efficiency due to frequent cooling and ramping up of heat.

Furthermore, biomass with high moisture content can be difficult to pyrolyze because additional heat energy is required to remove the moisture before pyrolysis can occur. As such, high moisture content biomass is required to be separately dried or treated prior to introduction to the pyrolysis chamber. Due to this requirement, many high moisture content biomasses are overlooked for use in pyrolysis when low moisture content biomass is accessible. Due to this, many types of biomass are overlooked as possible fuel sources and their energy value is not realised.

It would be advantageous to provide for a pyrolysis apparatus and method of use thereof that addresses one or more of these drawbacks or provides a useful commercial alternative.

SUMMARY OF THE INVENTION

In a first aspect, although it need not be the only or indeed the broadest form, the invention resides in a pyrolysis apparatus comprising:
  a. a pyrolysis chamber having a first end and a second end and comprising a centreless pyrolysis screw conveyor extending from the first end at least partially towards the second end of the pyrolysis chamber;
  b. a feed inlet adjacent the first end of the pyrolysis chamber;
  c. a biochar outlet adjacent the second end of the pyrolysis chamber; and
  d. a gas outlet in fluid communication with the pyrolysis chamber and located adjacent the first end,
wherein the feed inlet comprises a centreless feed screw conveyor and the second end of the pyrolysis chamber is free of gas outlets.

In an embodiment, the pyrolysis apparatus further comprises at least one gas injection port adjacent the second end.

In one embodiment, all gas outlets in fluid communication with the pyrolysis chamber are located substantially adjacent the first end.

In one embodiment, the centreless pyrolysis screw conveyor extends from the first end to at least about one third of the way along the pyrolysis chamber towards the second end.

In a further embodiment, the centreless pyrolysis screw conveyor extends from the first end to at least about half of the way along the pyrolysis chamber towards the second end.

Preferably, the centreless pyrolysis screw conveyor extends substantially between the first end and the second end.

In one embodiment, the centreless pyrolysis screw conveyor has an aperture or bore forming the centre of the centreless pyrolysis screw conveyor and this aperture or bore is substantially free from any structure or device. That is, the aperture or bore of the centreless pyrolysis screw conveyor is clear and/or can be described as a void which is defined by the flights of the centreless pyrolysis screw conveyor.

In certain embodiments, there is a spacing between an end of the centreless feed screw conveyor and the pyrolysis chamber.

In one embodiment, the biochar outlet comprises a centreless biochar screw conveyor.

In certain embodiments, there is a spacing between an end of the centreless biochar screw conveyor and an exit of the biochar outlet.

In another embodiment, the pyrolysis apparatus further comprises a biochar valve.

Preferably, the biochar valve is located at the end of the biochar outlet that is furthest away from the pyrolysis chamber.

In a further embodiment, the pyrolysis apparatus further comprises a biomass feed hopper in communication with the feed inlet.

In one embodiment, the pyrolysis apparatus further comprises a transfer chute extending between the feed inlet and the pyrolysis chamber.

In one embodiment, the pyrolysis chamber comprises an expansion chamber which the transfer chute and gas outlet open into.

In a second aspect, the invention resides in a method of processing biomass including the steps of:
a. providing a pyrolysis apparatus comprising
   i. a pyrolysis chamber having a first end and a second end and comprising a centreless pyrolysis screw conveyor extending from the first end at least partially towards the second end of the pyrolysis chamber;
   ii. a feed inlet adjacent the first end of the pyrolysis chamber;
   iii. a biochar outlet adjacent the second end of the pyrolysis chamber; and
   iv. a gas outlet in fluid communication with the pyrolysis chamber and located adjacent the first end, wherein the feed inlet comprises a centreless feed screw conveyor and the second end of the pyrolysis chamber is substantially free of gas outlets;
b. introducing biomass from the feed inlet into the first end of the pyrolysis chamber;
c. moving the biomass from the first end of the pyrolysis chamber to the second end of the pyrolysis chamber to pyrolyze the biomass and produce syngas and biochar;
d. removing the biochar from the pyrolysis chamber through the biochar outlet; and
e. causing the syngas to move in a direction generally from the second end to the first end to be removed through the gas outlet,
to thereby process the biomass.

In one embodiment, the method further includes the step of forming a biomass plug between the feed inlet and the pyrolysis chamber.

In one embodiment, the method further includes the step of forming a biochar plug at an exit of the biochar outlet.

In one embodiment, the method is a method for the continuous processing of biomass.

In certain embodiments, the pyrolysis may be carried out at a temperature of between about 400° C. to about 700° C.

The method may be carried out with a pressure of less than about 250 kPa, preferably less than 200 kPa, even more preferably less than about 150 kPa, still more preferably less than about 100 kPa or less than about 50 kPa.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
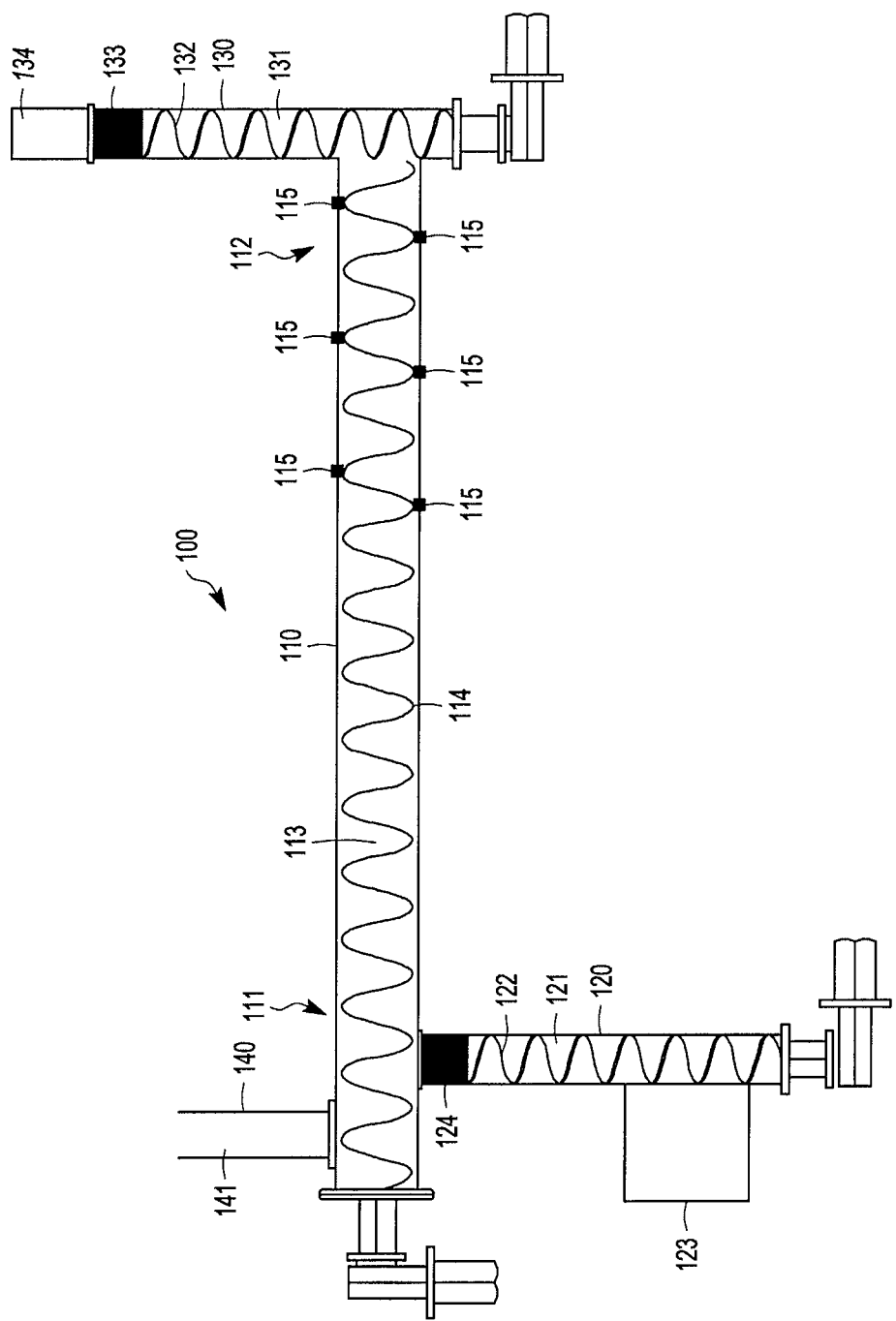
FIG. 1 is a plan view of the pyrolysis apparatus.

Embodiments of the present invention reside primarily in a pyrolysis apparatus and a method of processing biomass to produce syngas and biochar. Accordingly, the apparatus and method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or apparatus.

The term "biomass", as used herein, refers to renewable organic materials which may be used as fuels. Specific biomasses include, by way of non-limiting example, forestry products, agricultural products, animal matter, straw, wood chips and vine clippings.

The term "centreless screw conveyor", as used herein, refers to a mechanism that uses a rotating helical screw blade, which may be referred to as a flighting, to move granular or liquid materials along a pathway. The spiral coil is driven at one end and free at the other end and lacks the central shaft of traditional screw conveyors. The term as applied herein is used in the context of centreless screw conveyors being used to move material through a pyrolysis chamber "centreless pyrolysis screw conveyor", to introduce material to said chamber "centreless feed screw conveyor", and to accept and remove pyrolyzed material from said chamber "centreless biochar screw conveyor".

The term 'about', as used here, means that the amount is nominally the number following the term 'about' but the actual amount may vary from this precise number to an unimportant degree.

The term 'biochar', as used herein, can be interchanged with the term 'charcoal'.

Referring to FIG. 1 there is shown a pyrolysis apparatus. The pyrolysis apparatus 100 comprises a pyrolysis chamber 110 having a first end 111 and a second end 112. A feed inlet 120 is located generally adjacent the first end 111 and a biochar outlet 130 is located generally adjacent the second end 112. A gas outlet 140 is in fluid communication with the hollow interior of the pyrolysis chamber 110 and is located substantially adjacent the feed inlet 120 and, hence, adjacent the first end 111.

The pyrolysis chamber 110 is preferably in the shape of a pipe or tube and has a hollow interior or bore 113 along its length. The pyrolysis chamber 110 may be constructed from mild steel or other materials suitably resistant to high temperatures. In one embodiment, the pyrolysis chamber 110 may have a length which is about 8 to about 12 times greater than its diameter, preferably about 10 times its diameter. The pyrolysis chamber 110 advantageously comprises a centreless pyrolysis screw conveyor 114 which, in the embodiment shown, extends along the length of the bore 113. The centreless pyrolysis screw conveyor 114 is independently rotatable relative to the pyrolysis chamber 110. The centreless pyrolysis screw conveyor 114 acts to move biomass along the pyrolysis chamber 110 from the first end 111 to the second end 112. The centreless pyrolysis screw conveyor 114 provides distinct advantages in operation over a traditional shaft screw conveyor.

Traditional screw conveyors or paddles move biomass along but do not contribute towards more dense packing of that biomass. This means that any voids or cavities which are typically formed within the biomass during loading are largely maintained. Furthermore, traditional screw conveyors or paddles require more energy to move material compared to the centreless screw conveyor. The centreless screw conveyor requires less energy because there is less friction between the centreless screw conveyor and the material being moved. This improves the efficiency of the pyrolysis apparatus 100. Further to this, the use of a centreless screw conveyor reduces the likelihood of material (biomass or biochar) jamming between the outside of the centreless screw conveyor and the associated wall by virtue of the material being able to tumble and fall into the void of the centreless screw conveyor. Further to this, the rotation speed of the centreless screw conveyors can also be relatively slow and still be effective, which also reduces the wear on the screw.

The present centreless pyrolysis screw conveyor 114, not being provided with a central shaft, provides more space for the constant tumbling and reforming of the biomass bed and has been found to advantageously form a more dense bed with relatively few voids or cavities. This provides significant advantages in operation in that the dense biomass bed acts as an excellent countercurrent heat exchange system between the biomass at the first end of the pyrolysis chamber 110 and the heated syngas, and this is discussed in more detail hereinafter. In certain embodiments, the syngas is cooled from pyrolysis temperatures (400° C.-700° C.) to 60° C. to 80° C. and, at the same time, the introduced biomass is heated from ambient temperatures to drying temperatures and eventually to the pyrolysis temperature. This heat exchange therefore results in the removal of moisture in the biomass. The dense biomass bed produced by the tumbling effect additionally provides significant advantages in terms of the filtration of oils, tars and particles from the syngas. In one embodiment, the centreless pyrolysis screw conveyor 114 forms a densely packed biomass.

The relative absence of voids and cavities in the biomass requires the syngas to permeate, in a serpentine pathway, through the densely packed biomass which achieves significant heat exchange and filtration effects, and this is discussed in more detail hereinafter. Ultimately, the present centreless pyrolysis screw conveyor 114 provides for a higher overall energy efficiency and much cleaner syngas product which can be extracted and used in subsequent operations with no or minimal further cleaning operations. The resultant biochar and syngas are of commercial quality and quantity, and do not require further purification. This results in a more efficient process with a high output of useful products. For instance, a tonne of blue gum wood chips processed through the pyrolysis apparatus 100 produces syngas with an energy density of about 5 to about 9 $Mj/m^3$ in the amount of about 5 to about 7 Gj/tonne of biomass (dry basis), and between about 250 Kg and about 350 Kg of biochar at greater than 85% fixed carbon.

It will be appreciated that the dense packing of biomass is only truly beneficial in the portion of the pyrolysis chamber 110, closest to the first end 111, prior to pyrolysis occurring. The biomass is progressively dried and then pyrolysed as it moves through the pyrolysis zone by which point it has been reduced to about a third of its original volume and so no longer plays a role in filtration and purification of the syngas. Therefore, in one embodiment, the centreless pyrolysis screw conveyor 114 merely extends from the first end 111 at least partially towards the second end 112 of the pyrolysis chamber 110. In certain embodiments, the centreless pyrolysis screw conveyor 114 extends from the first end 111 to at least about one third of the way along the pyrolysis chamber 110 towards the second end 112. It may be that the centreless pyrolysis screw conveyor 114 simply ends at this point and biomass is pushed further along by the constant movement of more biomass being supplied by the centreless pyrolysis screw conveyor 114. In a further embodiment, the centreless pyrolysis screw conveyor 114 extends from the first end 111 to at least about half of the way along the pyrolysis chamber 110 towards the second end 112. Preferably, the centreless pyrolysis screw conveyor 114 extends substantially between the first end 111 and the second end 112. This embodiment is preferred as the advantages in packing of the biomass are obtained in the first third or so of the length of the pyrolysis chamber 110 (from the first end 111) and it is simpler in terms of construction to simply continue this conveyor design as far as is required to efficiently move the biomass through the pyrolysis zone and deliver it as close to the biochar outlet 130 as is required.

In one embodiment, the aperture or bore forming the centre of the centreless pyrolysis screw conveyor 114 is substantially free from any structure or device such as, for example a heating rod, gas injecting lancet or the like. That is, the aperture or bore of the centreless pyrolysis screw conveyor 114 is clear and/or can be described as a void which is defined by the flights of the centreless pyrolysis screw conveyor. If a structure was located through the aperture or bore of the centreless pyrolysis screw conveyor 114 then the advantages discussed above could not be realized to the same extent.

It will be appreciated that the location of the feed inlet 120, biochar outlet 130, and gas outlet 140 in relation to the pyrolysis chamber 110 is important to achieve the above-mentioned advantages. Further to this, the formation of the biomass plug 124 and biochar plug 133, discussed hereinafter, are also important to the present invention. The combination of these features result in the syngas being forced through the densely packed biomass, in the pyrolysis chamber 110, to exit through the gas outlet 140, and results in syngas substantially free of particulate matter. This densely packed biomass effectively filters the syngas of particular matter.

The pyrolysis chamber 110 is preferably a single chamber as this is more compact and utilizes fewer components. The use of fewer components reduces the risk of possible mechanical failures in the pyrolysis apparatus 100. In this regard, only a single pyrolysis chamber 110 is required to achieve countercurrent flow of the syngas. However, it will be appreciated by the person skilled in the art that multiple pipes or tubes can be used as long as countercurrent flow through the dense plug of biomass is achieved.

Condensates are formed within the pyrolysis chamber. These condensates include tars and oils and can cause fouling of the pyrolysis apparatus 100, the gas outlet 140 and downstream machinery using the syngas, such as boilers or engines. A problem with prior art pyrolysis apparatus is that significant quantities of oils and tars and particulate matter remain in the syngas leaving the pyrolyser. As such, the syngas from prior art pyrolysis apparatus may be unsuitable for use in modern high efficiency boilers, gas engines or gas turbines which require very low levels of particulates, oils and tars. Such syngas requires expensive purification systems.

The present pyrolysis apparatus 100 alleviates this problem through the continuous countercurrent filtering of the exiting syngas through the incoming densely packed biomass. Particulates, oils and tars are captured by the biomass and moved towards the pyrolysis zone. Very low levels of particulates, oils and tars remain in the syngas as it exits the pyrolysis apparatus 100 at gas outlet 140 (order of 10-100 mg/m$^3$).

The countercurrent flow of the syngas, as previously mentioned, heats and dries the biomass as it travels toward the gas outlet 140. The syngas is effectively filtered by the biomass whilst at the same time transferring thermal energy to the biomass. Another advantage of this countercurrent flow is that it maintains a large surface area contact with the biomass and allows for efficient thermal energy transfer.

In this regard, a heater or heating element, such as a lancet as may be used in the prior art, only results in a relatively small heat transfer surface area being created between the biomass and heat source, and does not facilitate efficient thermal energy transfer. The flow-on effects from this are slower conversion of biomass to biochar and syngas, more fouling of the pyrolysis apparatus and requiring faster rotation of the screw to ensure that the biomass is constantly being exposed to the heat source.

However, it will be appreciated that the main advantage of the present invention lies in the countercurrent flow of the syngas through the densely packed biomass. In this regard, it will be appreciated that the pyrolysis apparatus 100 can include a heating element which heats the biomass, near the second end 112 of the pyrolysis chamber 110, to pyrolysis temperatures. In this configuration, it will appreciated that the countercurrent flow of syngas will still be achieved and syngas substantially free of particulate matter is obtained.

In this embodiment, the heating element or heating elements may produce thermal energy from any electrical source. The thermal energy generated by the heating element(s) may be supplied by electricity, any other suitable energy source or from solar thermal energy. It would be advantageous to source this thermal energy from a renewable resource as it is more environmentally friendly.

The centreless pyrolysis screw conveyor 114 may be made of stainless steel and other appropriate materials as would be understood in the art. The speed at which it rotates can be controlled to move biomass through at an optimal speed, which may vary depending on the nature and moisture content of the biomass, whereby the biomass is fully pyrolysed without unnecessary additional time in the pyrolysis chamber 110.

The feed inlet 120 is generally adjacent to the first end 111 of the pyrolysis chamber 110. In one embodiment, the feed inlet 120 is only located adjacent the first end 111. In another embodiment, the feed inlet 120 is located within a third of the length of the pyrolysis chamber 110 from the first end 111 of the pyrolysis chamber 110. In a further embodiment, the feed inlet 120 is located within a quarter of the length of the pyrolysis chamber 110 from the first end 111 of the pyrolysis chamber 110. The feed inlet 120 has a hollow interior or bore 121. The feed inlet 120 further comprises a centreless feed screw conveyor 122 along the length of the bore 121. The centreless feed screw conveyor 122 is independently rotatable to the feed inlet 120 and is of a similar design to the centreless pyrolysis screw conveyor 114.

The rotational speed of the centreless feed screw conveyor 122 can be varied. It will be appreciated by a person skilled in the art that the rotational speed of the centreless feed screw conveyor 122 determines the rate at which biomass is introduced into the pyrolysis chamber 110 and, hence, into the centreless pyrolysis screw conveyor 114. The speed of rotation of the centreless feed screw conveyor 122 will be adjusted to fit with the speed of rotation of the centreless pyrolysis screw conveyor 114. This adjustment is preferably made through an automated system whereby adjustment of the speed of rotation of the centreless pyrolysis screw conveyor 114 to suit the biomass being provided automatically results in an appropriate adjustment in the speed of rotation of the centreless feed screw conveyor 122. Particularly, the balance of biomass flow between the centreless pyrolysis screw conveyor 114 and the centreless feed screw conveyor 122 may be maintained by sensing the torque of the centreless feed screw conveyor 122 which is sensitive to the level of biomass therein. This torque measurement is then used to fine tune the speed of delivery. In one embodiment, the rate of biomass introduction to the pyrolysis chamber 110 is controlled by stopping and restarting the rotation of the centreless feed screw conveyor 122 by sensing the torque of the centreless feed screw conveyor.

In preferred embodiments, there is a spacing in the bore 121 of the feed inlet 120 between an end of the centreless feed screw conveyor 122 adjacent the pyrolysis chamber 110, and the pyrolysis chamber 110. A particular advantage of the present inventive apparatus is that the centreless feed screw conveyor 122 is capable of generating a biomass plug 124 in this spacing or gap formed between the end of the centreless feed screw conveyor 122 closest the pyrolysis chamber 110 and the point of inlet to the pyrolysis chamber 110. The lack of presence of structure of the centreless feed screw conveyor 122 in this space results in the formation of a dense biomass plug 124. This biomass plug 124 has been found to be substantially gastight and so it is an efficient means of keeping syngas within the pyrolysis apparatus 100 without the need for any additional dedicated apparatus components for this purpose. A key advantage over the prior art is that, since the biomass is itself being used as the gastight seal, and it is constantly renewing itself through new biomass being introduced, the pyrolysis apparatus 100 is able to operate on a continuous basis rather than a batch basis. The advantages in continuous operation are clear and this is enabled in the present apparatus 100 by the use of the centreless feed screw conveyor 122. It has been found that by leaving a space in the bore 121 of the feed inlet 120 between the centreless feed screw conveyor 122 and the pyrolysis chamber 110, the biomass plug 124 is allowed to form in this space to build up and become denser and deeper thereby improving the sealing quality. In one embodiment, the surface of the feed inlet 120 adjacent the biomass plug 124 may be roughened, marked or provided with a higher friction coating or material to increase the grip of the biomass being forced through and thereby assist in forming and maintaining the density of the biomass plug 124. In a further embodiment, the biomass plug 124 can be adjusted to be deeper by increasing the length of the feed inlet 120 or by having the end of the centreless feed screw conveyor 122 a greater distance from the entrance to the pyrolysis chamber 110 and so improve the ability of the plug to form and "self-hold". In one embodiment, a biomass plug 124 is formed in the feed inlet 120. In another embodiment, the biomass plug 124 is formed in the feed inlet 120 adjacent the pyrolysis chamber 110. In one embodiment, the biomass plug 124 substantially prevents the pyrolysis chamber 110 and the feed inlet 120 being in fluid communication.

It has been found that this approach to biomass plug 124 formation and maintenance requires less torque, and so energy, from the centreless feed screw conveyor 122. It also results in a more reliable seal which is less inclined to blow out due to gas build up within the pyrolysis chamber 110.

The centreless pyrolysis screw conveyor 114 lies in a horizontal plane. However, it will be appreciated that the pyrolysis chamber 110 may deviate from this plane so long as it does not materially affect the workings of the pyrolysis chamber 110. The feed inlet 120 may introduce biomass to the pyrolysis chamber 110 at any angle as the biomass plug 124 is formed by friction between the biomass with the feed inlet 120, and the absence of flights of the centreless feed screw conveyor 122, in that section. In an embodiment, the angle formed between the feed inlet 120 and the pyrolysis chamber 110 is suitably between 0° and 90°, more preferably between 0° and 45° and most preferably 0° or 180°. In other words, it is most preferable to have the feed inlet 120 connected to the pyrolysis chamber 110 in the same plane.

In one embodiment, the feed inlet 120 may be connected to the pyrolysis chamber 110 via a transfer chute (not shown). The transfer chute assists in allowing the biomass plug 124 components to expand and fragment, and also provides a small surge chamber that ensures the entry to the centreless pyrolysis screw conveyor 114 is continuously 'flooded' with fresh biomass which maintains a full flighting in the centreless pyrolysis screw conveyor 114.

A biomass feed hopper 123 is in communication with the feed inlet 120. Biomass can be introduced to the feed inlet 120 through the biomass feed hopper 123. The biomass is then moved to the first end 111 of the pyrolysis chamber 110 by the centreless feed screw conveyor 122. For larger biomasses the biomass feed hopper 123 may receive biomass material from a diminution device (not shown) to reduce the size of the biomass. Specific devices include a shredder, rotating drum chopper, tub grinder and hammer mill. Other suitable mechanisms for reducing the size of the biomass matter will be evident to a person skilled in the art. It will be appreciated that not all biomass will need to be reduced in size. To achieve the full advantages of the compacting effect in the biomass plug 124 and the gas purification in the pyrolysis chamber 110 it is preferable if the biomass is less than about 25 mm in diameter. This allows for ease of tumbling and repacking within the biomass thereby affording appropriate density for the operations already described.

The pyrolysis chamber 110 may further comprise at least one gas injection port 115. The at least one gas injection port 115 is located generally towards the second end 112 of the pyrolysis chamber 110 in the region where pyrolysis will be occurring. The at least one gas injection port 115 injects gas into the pyrolysis chamber 110 to initiate a minimum required level of combustion of biomass to maintain a suitable temperature range. The gas injected into the pyrolysis chamber 110 can be any gas that is capable of initiating combustion. Suitable gases include oxygen or any oxygen containing gas, such as atmospheric air. Therefore, combustion of biomass will occur on moving from the first end 111 towards the second end 112 of the pyrolysis chamber 110 and this leads to a temperature gradient being formed between the first end 111 and the second end 112. The pyrolysis chamber 110 is insulated to prevent loss of the heat generated during pyrolysis.

The at least one gas injection port is located generally toward the second end so that a temperature gradient is formed in the pyrolysis chamber 110. As previously mentioned, the densely packed biomass is only truly beneficial in the portion of the pyrolysis chamber 110 closest the first end 110. If the at least one gas injection port 115 is located throughout the pyrolysis chamber 110 then the biomass will reduce in volume and not form the densely packed biomass. As such, the at least one gas injection port is located toward the second end 112 so that pyrolysis, and thus syngas generation only occurs towards the second end 112. This forces the hot syngas in a countercurrent direction. In one embodiment, the at least one gas injection port 115 is only located adjacent the second end 112. In another embodiment, the at least one gas injection port 115 is located within a third of the length of the pyrolysis chamber 110 from the second end 112 of the pyrolysis chamber 110. In a further embodiment, the at least one gas injection portion 115 is located within a quarter of the length of the pyrolysis chamber 110 from the second end 111 of the pyrolysis chamber 110. This also results in thermal energy gradually being transferred to the biomass and a temperature gradient is formed. The temperature gradient allows pyrolysis to occur adjacent the second end 112 whilst maintaining densely packed biomass near the first end. In one embodiment, a temperature gradient is formed in the pyrolysis chamber.

It will be appreciated by those skilled in the art that other methods may be used to introduce gas into the pyrolysis chamber 110. Another suitable method may be the use of a lance positioned to introduce a gas into the pyrolysis chamber 110 to initiate combustion of the biomass.

The temperature at the second end 112 is suitably greater than about 200° C., more suitably between about 200° C. and about 1000° C., preferably between about 400° C. and about 600° C., and most preferably between 450° and about 550° C. It will be appreciated that the pyrolysis apparatus 100 has been described for use in pyrolysis for convenience. It will be appreciated by the person skilled in the art that the pyrolysis apparatus 100 and method described herein can be equally applied to torrefaction and gasification.

For instance, when the pyrolysis apparatus is applied to torrefaction, the temperature of the second end 112 is suitably greater than about 150° C., more suitably between about 150° C. and about 500° C., preferably between about 200° C. and about 400° C. and most preferably between 200° and about 350° C. Alternatively, when the pyrolysis apparatus is used for gasification, the temperature of the second end 112 is suitably greater than about 400° C., more suitably between about 500° C. and about 1500° C., preferably between about 700° C. and about 1000° C.

The temperature of the pyrolysis chamber 110 is monitored by multiple sensors which will feed back to a control system and control the amount of gas injected by the at least one gas injection port 115 and/or the lance, which in turn determines how much heat is generated from combustion and so the temperature of the second end 112 of the pyrolysis chamber 110.

The biochar outlet 130 is located at the second end 112 of the pyrolysis chamber 110, and further comprises a hollow interior or bore 131 and a centreless biochar screw conveyor 132. In one embodiment, the biochar outlet 130 is only located adjacent the second end 112. In another embodiment, the biochar outlet 130 is located within a third of the length of the pyrolysis chamber 110 from the second end 112 of the pyrolysis chamber 110. In a further embodiment, the biochar outlet 130 is located within a quarter of the length of the pyrolysis chamber 110 from the second end 112 of the pyrolysis chamber 110. The centreless biochar screw conveyor 132 is located along the length of bore 131 and is independently rotatable relative to the biochar outlet 130. The rotational movement of the centreless biochar screw conveyor 132 removes the biochar from the pyrolysis chamber 110 through an exit of the biochar outlet 130. In one preferred embodiment, there is a spacing between an end of the centreless biochar screw conveyor 132 furthest from the pyrolysis chamber 110 and an exit of the biochar outlet 130. This will encourage formation of a biochar plug 133 in the space between the end of the centreless biochar screw conveyor 132 and the exit of the biochar outlet 130. All of the comments made for the feed inlet 120 apply mutatis mutandis to the biochar outlet 130 including the approach to forming the biochar plug 133 and the optional use of an increased friction surface in the region adjacent the exit of the biochar outlet 130. The rotational speed of the centreless biochar screw conveyor 132 can be varied as described previously for the other conveyors. It will be appreciated by a person skilled in the art that the rotational speed of the centreless biochar screw conveyor 132 determines the rate at which biochar is removed from the pyrolysis chamber 110 and so will be automatically adjusted based on the rate set for the centreless pyrolysis screw conveyor 114. In one embodiment, a biochar plug 133 is formed in the biochar outlet 130. In another embodiment, the biochar plug 133 is formed in the space between the end of the centreless biochar screw conveyor 132 and the exit of the biochar outlet 130. In one embodiment, the biochar plug 133 prevents the biochar outlet 130 being in fluid communication with the external atmosphere.

The pyrolysis chamber 120 may introduce biochar to the biochar outlet 130 at any angle as the biochar plug 133 is formed by friction between the biochar with the biochar outlet 130, and the absence of flights of the centreless biochar screw conveyor 132, in that section. In an embodiment, the angle formed between pyrolysis chamber 110 and the biochar outlet 130 is suitably between 0° and 90°, more preferably between 0° and 45° and most preferably 0° or 180°. In other words it is most preferably to have the biochar outlet 130 connected to the pyrolysis chamber 110 in the same plane.

In FIG. 1, the biochar outlet 130 extends across the pyrolysis chamber 110. The biochar that is formed in the second end 112 of the pyrolysis chamber 110 falls into the flights of the centreless biochar screw conveyor 132. Water or recovered condensate is sprayed onto the biochar as it travels along the biochar outlet 130 to cool and passivate the biochar and to enable the correct moisture content to form the biochar plug 133. Therefore, as the biochar travels along the biochar outlet 130, it is cooled and the moisture content increases so that the resultant biochar is safe to handle and store.

The gas outlet 140 has a bore 141 along its length and may be a standard gas transfer pipe or tube. The gas outlet 140 is in fluid communication with the pyrolysis chamber 110 and removes syngas from the pyrolysis chamber 110. In one embodiment, the gas outlet 140 and transfer chute sits within an expansion chamber. The expansion chamber reduces the gas velocity of the syngas to encourage dis-entrainment of any biomass particles and condensate droplets. In one embodiment, the gas outlet 140 further comprises a basket of biomass that can be replaced from time to time which further ensures that no particulate matter is present in the syngas.

In one embodiment, the gas outlet 140 is located only in the area adjacent the first end 111 of the pyrolysis chamber 110. In another embodiment, the gas outlet 140 is located within a third of the length of the pyrolysis chamber 110 from the first end 111 of the pyrolysis chamber 110. In a further embodiment, the gas outlet 140 is located within a quarter of the length of the pyrolysis chamber 110 from the first end 111 of the pyrolysis chamber 110. In one embodiment, the gas outlet 140 is located substantially adjacent the first end 111 of the pyrolysis chamber 110. In one embodiment, all gas outlets in fluid communication with the pyrolysis chamber 110 are located substantially adjacent the first end.

It will be appreciated by the person skilled in the art that more than one gas outlet 140 can be utilized in the present invention so long as these gas outlets 140 are located as described hereinabove. In one embodiment, the pyrolysis apparatus comprises more than one gas outlet. It will be appreciated that the gas outlet 140 is required to be placed before the pyrolysis zone and before the densely packed biomass to achieve the desired countercurrent flow, filtering of syngas and efficient thermal energy transfer.

One advantage to the apparatus 100 is that the biomass does not need to be dried prior to introduction to the pyrolysis chamber 110 so biomass with higher moisture content can therefore be utilized. Much of the sensible and latent heat in the syngas is transferred to the incoming biomass, resulting in drying the biomass. The moisture content of the biomass which may be utilised is suitably from 0% to 70%, more suitably from 0% to 50%, preferably from about 0% to 40%, and most preferably from about 0% to 30%. As discussed previously, the drying effect is achieved by the temperature gradient set up when syngas is produced adjacent the second end 112 of the pyrolysis chamber 110 such that it is caused to move towards the first end 111. The syngas is, of course, at a high temperature, having just been formed from the pyrolysis of the biomass, and as it passes through the newly entering biomass it heats that incoming biomass up and causes it to lose moisture. This has the additional benefit of cooling the syngas. Due, in part, to the effective packing of the biomass towards the first end 111 the biomass is intimately contacted with the syngas meaning an efficient transfer of heat is obtained and so higher moisture content biomass materials, which would typically be overlooked, or require separate drying processes, can be utilised.

In another embodiment, the pyrolysis apparatus 100 further comprises a biochar valve 134. The biochar valve 134 may comprise one or more valves in series. The biochar valve 134 may be connected to the exit of the biochar outlet 130. In one embodiment the biochar valve 134 may be a rotary valve such as a segment rotary valve. In this embodiment, biochar exits the pyrolysis chamber 110 and is removed by the centreless biochar screw conveyor 132. Water or condensate is added to the biochar, to cool it, while it is in contact with the centreless biochar screw conveyor 132 and after being delivered to the spacing the biochar plug 133 is formed. The biochar from the biochar plug 133 then enters, and passes through the biochar valve 134 and into the external atmosphere where it may be deposited onto a conveyor belt or the like. The biochar valve 134 therefore provides a countermeasure for a potential failure of the biochar plug 133. In the event that the biochar plug 133 becomes too fluid due to excessive addition of water or from condensate, the biochar plug 133 may fail to maintain the biochar outlet 130 and external atmosphere in non-fluid communication and so, in this instance, the biochar valve 134 would assist.

In one embodiment, the biochar valve 134 is a rotary valve. The rotary valve may contain several segments which are sealed and as the segment rotary valve rotates the segments ensure that the biochar outlet 130 and the external atmosphere are not in fluid communication. The segment rotary valve has at least 2 segments, preferably 5 or 6. In a preferred embodiment, the biochar valve 134 is a double rotary valve.

The pyrolysis apparatus can further comprise pressure sensors in the feed inlet 120, the pyrolysis chamber 110 and biochar outlet 130. These pressure sensors can be used to monitor the pressure in each section and ensure that the biomass plug 124 and biochar plug 133 do not fail due to excessive pressure differentials. The pyrolysis apparatus 100 was equipped with pressure sensors and monitored during the process. It was found that there was a pressure drop of between about 10 and about 50 KPa between the pyrolysis zone and the biomass entry which is indicative of syngas filtration through the densely packed biomass.

Figure 2:
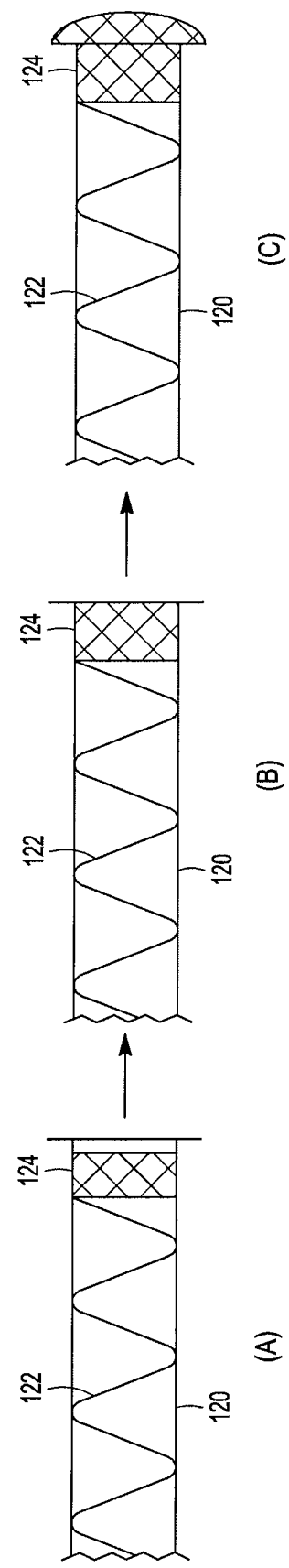
FIG. 2 is a process of forming a biomass plug.

Referring to FIG. 2 there is shown a diagram of the feed inlet 120. In step (a) there is shown a centreless feed screw conveyor 122 and a biomass plug 124. As the centreless feed screw conveyor 122 rotates it continuously moves biomass toward the first end 111 of the pyrolysis chamber 110. As the centreless feed screw conveyor 122 rotates it also moves and adds more biomass to the biomass plug 124, which is formed in the space between the end of the centreless feed screw conveyor 122 nearest the pyrolysis chamber 110 and the pyrolysis chamber 110. In step (b) there is shown the centreless feed screw conveyor 122 and the biomass plug 124 which has had further biomass added. As the centreless feed screw conveyor 122 rotates it adds more biomass to the biomass plug 124 and it simultaneous pushes the biomass plug 124 into the first end 111 of the pyrolysis chamber 110. Therefore, the biomass plug 124 is continually being expanded and pushed into the pyrolysis chamber 110 whilst ensuring that the pyrolysis chamber 110 is not in fluid communication with the feed inlet 120 thereby preventing the escape of syngas and the entrance of undesirable amounts of air. In step (c) there is shown the leading end of the biomass plug 124 collapsing and being removed by the centreless pyrolysis screw conveyor 114; a process which is repeated in continuous operation.

Figure 3:
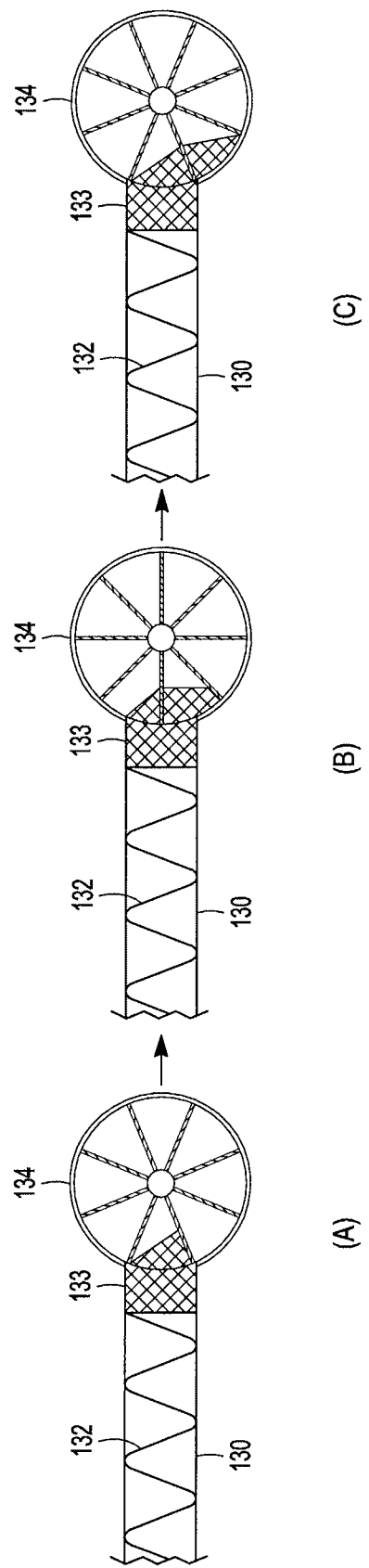
FIG. 3 is a process of forming a biochar plug.

Referring to FIG. 3 there is shown a diagram of the biochar outlet 130. In step (a) there is shown the biochar outlet 130, the centreless biochar screw conveyor 132 and the biochar plug 133 formed in the space between the end of the centreless biochar screw 132 furthest from the pyrolysis chamber 110 and the exit of the biochar outlet 130. As the centreless biochar screw conveyor 132 rotates it moves the biochar from pyrolysis chamber 110 and adds it to the biochar plug 133, and thus into the biochar valve 134. In step (b) there is shown the centreless biochar screw conveyor 132 and the biochar plug 133 which has had more biochar added. As the centreless biochar screw conveyor 132 rotates and adds more biochar to the biochar plug 133, it simultaneously pushes the biochar plug 133 out of the exit of the biochar outlet 130 and into the biochar valve 134. The biochar valve 134 rotates and ensures that the biochar outlet 130 is not in fluid communication with the external atmosphere. In step (c) there is shown the leading end of the biochar plug 133 being removed through the exit of the biochar outlet 130 and into another segment of the biochar valve 134. This process is continuously repeated.

In operation, it will be appreciated that biomass material, to be processed, is loaded into the biomass feed hopper 123. It may have optionally been reduced in size prior to loading into the hopper. The biomass is then moved through the feed inlet 120 by the centreless feed screw conveyor 122. The rotational movement of the centreless feed screw conveyor 122 moves the biomass towards the first end 111 of the pyrolysis chamber 110. There may be a spacing between an end of the centreless feed screw conveyor 122 and the first end 111 of the pyrolsis chamber 110. The centreless feed screw conveyor 122 adds biomass and results in the formation of the biomass plug 124 in the feed inlet 120 adjacent the pyrolysis chamber 110. The biomass plug 124 is dense and relatively absent of large air voids to thereby substantially prevent fluid communication between the pyrolysis chamber 110 and the feed inlet 120. The centreless feed screw conveyor 122 continuously adds biomass to the biomass plug 124 and simultaneously pushes the biomass plug 124 into the pyrolysis chamber 110. This action of adding biomass to the biomass plug 124 maintains the biomass plug 124, while also introducing biomass into the first end 111 of the pyrolysis chamber 110.

The biomass from the biomass plug 124 is then moved from the first end 111 to the second end 112 of the pyrolysis chamber 110 by the centreless pyrolysis screw conveyor 114. The pyrolysis chamber 110 has at least one gas injection port 115 which injects gas to initiate combustion of a small portion of the biomass to provide the necessary temperature for pyrolysis. As such the pyrolysis chamber 110 has a temperature gradient, increasing from the first end 111 to the second end 112.

The rotational movement of the centreless pyrolysis screw conveyor 114 constantly tumbles and repacks the biomass to remove air voids and so a dense volume of biomass is present at the first end 111 of the pyrolysis chamber 110. This dense volume of biomass acts as a filter and heat exchanger, discussed herein. The centreless pyrolysis screw conveyor 114 continuously adds new biomass as it is simultaneously pushing the biomass towards the second end 112. As the biomass is moved the temperature increase will initially remove any volatile substances, such as hydrocarbons and moisture, from the biomass before pyrolysis is then initiated. This process results in biochar accumulation near the second end 112 of the pyrolysis chamber 110.

The biochar in the pyrolysis chamber 110 is then removed through the exit of the biochar outlet 130. There is a spacing between an end of the centreless biochar screw conveyor 132 and the exit of the biochar outlet 130. During the exiting process, the centreless biochar screw conveyor 132 forms the biochar plug 133 as the biochar is moved towards the exit of the biochar outlet 130. The biochar plug 133 is dense and absent of large gas voids and thereby substantially prevents fluid communication between the biochar outlet 130 and the external atmosphere. Newly formed dry biochar can show pyrophoric behavior and as such may spontaneously ignite when exposed to air. To alleviate this problem a controlled amount of water or condensate may be added to the biochar via one or more water inlets located within the biochar outlet 130, preferably adjacent a portion of the centreless biochar screw conveyor 132 such that biochar is contacted with the water prior to exiting the centreless biochar screw conveyor 132 and forming the biochar plug 133.

The syngas produced during pyrolysis is removed through the gas outlet 140. The gas outlet 140 is located adjacent to the first end 111 of the pyrolysis chamber 110 and adjacent to the feed inlet 120. In one embodiment, the gas outlet 140 is located substantially adjacent the feed inlet 120. It may be accommodated within an expansion chamber. The syngas is removed through the gas outlet 140 and the syngas may then be used directly as a fuel source to generate electricity and/or process heat in boilers, gas engines or gas turbines. The syngas must travel generally from the second end 112 to the first end 111 of the pyrolysis chamber 110 to be removed by the gas outlet 140. As previously mentioned the centreless pyrolysis screw conveyor 114 forms a dense biomass adjacent the first end 111 of pyrolysis chamber 110. This dense biomass is substantially absent of large voids. The syngas must permeate through the dense biomass to the gas outlet 140 and in doing so is effectively "filtered" by the dense biomass to remove oil, tar and particulate matter. The dense biomass also acts as a heat exchanger whereby the syngas gives up most of its latent heat to dry and heat the incoming biomass. If large voids are present then the syngas will find the path of least resistance (through the voids) and the oil, tar and particulate matter will not be removed from the syngas and the heat exchange will be less effective. The pyrolysis apparatus 100 substantially reduces or avoids this issue.

The gas outlet 140 ensures that the pyrolysis chamber 110 operates at a low pressure (<50 kPA). The pyrolyser is designed to be intrinsically safe because there is very little flammable gas present in the pyrolysis chamber 110 at any one time. The pyrolysis apparatus 100 can further comprise an automatic nitrogen purge unit. The automatic nitrogen purge unit may be placed in fluid communication with the pyrolysis chamber 110. The automatic nitrogen purge unit purges the pyrolysis chamber 110 with nitrogen to ensure that any uncontrolled combustion is starved of oxygen. It will be appreciated by those skilled in the art that any gas that is able to starve a fire can be used in the purge unit. Suitable gases include nitrogen, helium, neon, argon, krypton, xenon or carbon dioxide.

The gas pressure of the pyrolysis apparatus 100 is monitored by a control system. The control system maintains the gas pressure at the gas outlet 140 at a slight negative pressure (20 to 100 Pa) by controlling the rate at which the syngas is removed from the pyrolysis apparatus 100. This results in the pressure on either side of the biomass plug 124 being similar and if there is any leakage then a small amount of air is removed with the syngas via the gas outlet, and none of the syngas is leaked into the atmosphere.

It has been shown that the present pyrolysis apparatus 100 can continuously pyrolyze biomass and continuously collect clean syngas. Further to this, the present pyrolysis apparatus 100 can pyrolyze biomass with high moisture content. These advantages are possible due to the use of the various centreless screw conveyors making the biomass plug 124 and the biochar plug 133, which substantially prevent fluid communication of the pyrolysis chamber 110 with the external environment, and the densely packed incoming biomass which effectively filters and transfers heat from the existing syngas. The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A pyrolysis apparatus comprising:
   a. a pyrolysis chamber having a first end and a second end and comprising a centreless pyrolysis screw extending from the first end at least partially towards the second end of the pyrolysis chamber and configured to form a biomass bed;
   b. a feed inlet adjacent the first end of the pyrolysis chamber;
   c. a biochar outlet adjacent the second end of the pyrolysis chamber;
   d. a gas outlet in fluid communication with the pyrolysis chamber and located adjacent the first end; and
   e. at least one gas injection port located adjacent the second end,
   wherein the feed inlet comprises a centreless feed screw and a spacing between an end of the centreless feed screw and the pyrolysis chamber, wherein the biochar outlet comprises a centreless biochar screw and a spacing between an end of the centreless biochar screw and an exit of the biochar outlet, wherein the second end of the pyrolysis chamber is free of gas outlets, and wherein the centreless feed screw is configured to form a biomass plug in the spacing between the end of the centreless feed screw and the pyrolysis chamber.

2. The pyrolysis apparatus of claim 1, wherein a temperature gradient is formed in the pyrolysis chamber.

3. The pyrolysis apparatus of claim 1, wherein the pyrolysis apparatus further comprises a biochar valve in communication with the biochar outlet.

4. The pyrolysis apparatus of claim 1, wherein gas injected through the at least one gas injection port is selected from oxygen or atmospheric air.

5. The pyrolysis apparatus of claim 1, wherein the at least one gas injection port is only located adjacent the second end.

6. The pyrolysis apparatus of claim 1, wherein the at least one gas injection port is located within a third of the length of the pyrolysis chamber from the second end.

7. The pyrolysis apparatus of claim 1, wherein the centreless biochar screw is configured to form a biochar plug in the spacing between the end of the centreless biochar screw and the exit of the biochar outlet.

8. A method of processing biomass including the steps of:
   a. providing a pyrolysis chamber comprising:
      i. a pyrolysis chamber having a first end and a second end and comprising a centreless pyrolysis screw extending from the first end at least partially towards the second end of the pyrolysis chamber and configured to form a biomass bed;
      ii. a feed inlet adjacent the first end of the pyrolysis chamber;
      iii. a biochar outlet adjacent the second end of the pyrolysis chamber;
      iv. a gas outlet in fluid communication with the pyrolysis chamber and located substantially adjacent the first end, wherein the feed inlet comprises a centreless feed screw and a spacing between an end of the centreless feed screw and the pyrolysis chamber, wherein the centreless feed screw is configured to form a biomass plug in the spacing between the end of the centreless feed screw and the pyrolysis chamber, and the second end of the pyrolysis chamber is free of gas outlets; and
      v. at least one gas injection port located adjacent the second end,
   b. introducing biomass from the feed inlet to the first end of the pyrolysis chamber;
   c. moving the biomass from the first end of the pyrolysis chamber to the second end of the pyrolysis chamber to pyrolyze the biomass and produce syngas and biochar;
   d. removing the biochar from the pyrolysis chamber through the biochar outlet; and
   e. causing the syngas to move in a direction generally from the second end to the first end to be removed through the gas outlet,
   to thereby process the biomass.

9. The method of claim 8, wherein a biochar plug is formed in the biochar outlet.

10. The method of 8, wherein a packed biomass is formed in the pyrolysis chamber.

11. The method of claim 9, wherein syngas is filtered by the packed biomass.

12. The method of claim 8, wherein biomass is processed continuously.

13. A pyrolysis apparatus comprising:
   a. a pyrolysis chamber having a first end and a second end and comprising a centreless pyrolysis screw extending from the first end at least partially towards the second end of the pyrolysis chamber and configured to form a biomass bed;
   b. a feed inlet adjacent the first end of the pyrolysis chamber;
   c. a biochar outlet adjacent the second end of the pyrolysis chamber; and
   d. a gas outlet in fluid communication with the pyrolysis chamber and located adjacent the first end; and
   e. at least one gas injection port located adjacent the second end, wherein the feed inlet comprises a centreless feed screw and a spacing between an end of the centreless feed screw and the pyrolysis chamber, wherein the centreless feed screw is configured to form a biomass plug in the spacing between the end of the centreless feed screw and the pyrolysis chamber, wherein the biochar outlet comprises a centreless biochar screw configured to form a biochar plug, and wherein the second end of the pyrolysis chamber is free of gas outlets.

14. The pyrolysis apparatus of claim 13, wherein a temperature gradient is formed in the pyrolysis chamber.

15. The pyrolysis apparatus of claim 13, wherein gas injected through the at least one gas injection port is selected from oxygen or atmospheric air.

16. The pyrolysis apparatus of claim 13, wherein the at least one gas injection port is only located adjacent the second end.

* * * * *